United States Patent
Cormier et al.

(10) Patent No.: US 10,982,451 B2
(45) Date of Patent: Apr. 20, 2021

(54) PROGRESSIVE STAGE LOAD DISTRIBUTION AND ABSORPTION UNDERLAYMENT SYSTEM

(71) Applicant: VICONIC SPORTING LLC, Dearborn, MI (US)

(72) Inventors: Joel Matthew Cormier, Lathrup Village, MI (US); Jackson Alexander Elliott, Plymouth, MI (US); Richard Francois Audi, Dearborn, MI (US); Donald Scott Smith, Commerce, MI (US)

(73) Assignee: VICONIC SPORTING LLC, Dearborn, MI (US)

( * ) Notice: Subject to any disclaimer, the term of this patent is extended or adjusted under 35 U.S.C. 154(b) by 0 days.

(21) Appl. No.: 16/293,363

(22) Filed: Mar. 5, 2019

(65) Prior Publication Data
US 2020/0141132 A1 May 7, 2020

Related U.S. Application Data

(63) Continuation-in-part of application No. 16/182,931, filed on Nov. 7, 2018.

(51) Int. Cl.
*E04F 15/22* (2006.01)
*E04F 13/07* (2006.01)
(Continued)

(52) U.S. Cl.
CPC ............ *E04F 15/225* (2013.01); *A47G 27/02* (2013.01); *B32B 3/30* (2013.01); *B32B 7/12* (2013.01);
(Continued)

(58) Field of Classification Search
CPC ... E04F 15/225; E04F 15/02183; E04F 13/07; E04H 1/02; E04H 3/08; E04H 3/14;
(Continued)

(56) References Cited

U.S. PATENT DOCUMENTS 1,784,511 A   12/1930   Carns
1,958,050 A   5/1934    Koppelman
(Continued)

FOREIGN PATENT DOCUMENTS

EP   1422344   11/2002
EP   2154291   2/2010
(Continued)

OTHER PUBLICATIONS

US 7,624,546 B2, 01/2009, Moller, Jr. (withdrawn)

*Primary Examiner* — Brian E Glessner
*Assistant Examiner* — Adam G Barlow
(74) *Attorney, Agent, or Firm* — Brooks Kushman P.C.

(57) ABSTRACT

A progressive stage load distributing and absorbing system that lies below a superstructure material which is exposed to percussive forces. The progressive stage load distributing and absorbing system is interposed between the superstructure material and a foundation. The system has a barrier layer that lies below the superstructure material and an underlayment infrastructure positioned below the barrier layer. Included in the underlayment infrastructure are hat-shaped absorbing members that have a relatively compliant stage subsystem and one or more relatively stiff stage subsystems.

20 Claims, 6 Drawing Sheets

(51) Int. Cl.
*E04H 1/02* (2006.01)
*E04H 3/08* (2006.01)
*E04H 3/14* (2006.01)
*E04H 9/06* (2006.01)
*E04F 15/02* (2006.01)
*E01C 13/04* (2006.01)
*E02B 3/06* (2006.01)
*B60N 2/42* (2006.01)
*F42D 5/05* (2006.01)
*B32B 3/30* (2006.01)
*B32B 13/12* (2006.01)
*B32B 7/12* (2006.01)
*A47G 27/02* (2006.01)
*B29K 75/00* (2006.01)
*B29C 51/10* (2006.01)
*B29L 31/00* (2006.01)

(52) U.S. Cl.
CPC ........... *B32B 13/12* (2013.01); *B60N 2/42* (2013.01); *E01C 13/04* (2013.01); *E02B 3/068* (2013.01); *E04F 13/07* (2013.01); *E04F 15/02038* (2013.01); *E04F 15/02183* (2013.01); *E04H 1/02* (2013.01); *E04H 3/08* (2013.01); *E04H 3/14* (2013.01); *E04H 9/06* (2013.01); *F42D 5/05* (2013.01); *B29C 51/10* (2013.01); *B29K 2075/00* (2013.01); *B29L 2031/732* (2013.01); *B32B 2307/56* (2013.01); *B32B 2307/7265* (2013.01); *B32B 2471/00* (2013.01); *E04F 2290/044* (2013.01)

(58) Field of Classification Search
CPC .. E02B 3/068; F42D 5/05; B60N 2/42; B32B 3/30; A47G 27/02
USPC ........................ 52/403.1, 480, 177
See application file for complete search history.

(56) References Cited

U.S. PATENT DOCUMENTS

| | | |
|---|---|---|
| 1,995,728 A | 3/1935 | Aldrich |
| 2,090,881 A | 8/1937 | Wilson |
| 2,225,067 A | 12/1940 | Marin |
| 2,275,575 A | 3/1942 | Vrooman |
| 2,349,907 A | 5/1944 | Kos et al. |
| 2,391,997 A | 1/1946 | Noble |
| 2,434,641 A | 1/1948 | Burns |
| 2,924,419 A | 2/1960 | Wells |
| 3,011,602 A | 12/1961 | Ensrud et al. |
| 3,018,015 A | 1/1962 | Agriss et al. |
| 3,071,216 A | 1/1963 | Jones et al. |
| 3,108,924 A * | 10/1963 | Adie ............... E04C 2/3405 428/158 |
| 3,196,763 A | 7/1965 | Rushton |
| 3,204,667 A | 9/1965 | Zahorski |
| 3,231,454 A * | 1/1966 | Williams ............. F16F 9/0481 428/132 |
| 3,525,663 A | 8/1970 | Hale |
| 3,597,891 A | 8/1971 | Martin |
| 3,605,145 A | 9/1971 | Graebe |
| 3,802,790 A | 4/1974 | Blackburn |
| 3,828,715 A | 8/1974 | Matsushita |
| 3,834,487 A * | 9/1974 | Hale ..................... E04B 1/86 181/292 |
| 3,871,636 A | 3/1975 | Boyle |
| 3,876,492 A | 4/1975 | Schnott |
| 3,933,387 A | 1/1976 | Salloum et al. |
| 3,938,963 A | 2/1976 | Hale |
| 3,980,221 A | 9/1976 | Okada |
| 3,997,207 A | 12/1976 | Norlin |
| 4,029,280 A | 6/1977 | Golz |
| 4,029,350 A | 6/1977 | Goupy et al. |
| 4,190,276 A | 2/1980 | Hirano et al. |
| 4,233,793 A | 11/1980 | Omholt |
| 4,321,989 A | 3/1982 | Meinzer |
| 4,352,484 A | 10/1982 | Gertz et al. |
| 4,413,856 A | 11/1983 | McMahan et al. |
| 4,497,853 A | 2/1985 | Tomarin |
| 4,530,197 A | 7/1985 | Rainville |
| 4,631,221 A | 12/1986 | Disselbeck et al. |
| 4,635,981 A | 1/1987 | Friton |
| 4,666,130 A | 5/1987 | Denman et al. |
| 4,696,401 A | 9/1987 | Wallace |
| 4,710,415 A | 12/1987 | Slosberg et al. |
| 4,720,261 A | 1/1988 | Fishwick et al. |
| 4,739,762 A | 4/1988 | Palmaz |
| 4,755,416 A | 7/1988 | Schneider et al. |
| 4,757,665 A | 7/1988 | Hardigg |
| 4,844,213 A | 7/1989 | Travis |
| 4,869,032 A | 9/1989 | Geske |
| 4,879,857 A * | 11/1989 | Peterson ............... E01C 13/02 52/403.1 |
| 4,890,877 A | 1/1990 | Ashtiani-Zarandi et al. |
| 4,909,661 A | 3/1990 | Ivey |
| 4,980,877 A | 12/1990 | Sugiyama et al. |
| 5,030,501 A | 7/1991 | Colvin et al. |
| 5,033,593 A | 7/1991 | Kazuhito |
| 5,054,753 A | 10/1991 | Polus |
| 5,085,424 A | 2/1992 | Wood, Jr. |
| 5,141,279 A | 8/1992 | Weller |
| 5,165,990 A | 11/1992 | Nakano |
| 5,192,157 A | 3/1993 | Laturner |
| 5,306,066 A | 4/1994 | Saathoff |
| 5,364,682 A | 11/1994 | Tanaka et al. |
| 5,383,314 A * | 1/1995 | Rothberg ............... E02D 31/02 405/43 |
| 5,390,467 A * | 2/1995 | Shuert ................... B29C 51/10 156/292 |
| 5,391,251 A * | 2/1995 | Shuert ................ B65D 19/0022 108/57.27 |
| 5,399,406 A * | 3/1995 | Matsuo .................. B32B 3/12 428/57 |
| 5,401,347 A | 3/1995 | Shuert |
| 5,435,619 A | 7/1995 | Nakae et al. |
| 5,444,959 A | 8/1995 | Tesch |
| 5,500,037 A | 3/1996 | Alhamad |
| 5,518,802 A | 5/1996 | Colvin et al. |
| 5,551,673 A | 9/1996 | Furusawa et al. |
| 5,573,272 A | 11/1996 | Teshima |
| 5,619,832 A * | 4/1997 | Myrvold ................ E02D 31/02 52/403.1 |
| 5,636,866 A | 6/1997 | Suzuki et al. |
| 5,660,426 A | 8/1997 | Sugimori et al. |
| 5,679,967 A | 10/1997 | Janai et al. |
| 5,700,545 A | 12/1997 | Audi et al. |
| 5,727,826 A | 3/1998 | Frank et al. |
| 5,744,763 A | 4/1998 | Iwasa et al. |
| 5,762,392 A | 6/1998 | Suga |
| 5,833,386 A | 11/1998 | Rosan et al. |
| 5,972,477 A | 10/1999 | Kim et al. |
| 6,017,084 A | 1/2000 | Carroll, III et al. |
| 6,044,606 A | 4/2000 | Hamar |
| 6,199,942 B1 | 3/2001 | Carroll, III et al. |
| 6,205,728 B1 | 3/2001 | Sutelan |
| 6,221,292 B1 | 4/2001 | Carroll, III |
| 6,247,745 B1 | 6/2001 | Carroll, III et al. |
| 6,315,339 B1 | 11/2001 | Devilliers et al. |
| 6,318,755 B1 | 11/2001 | Nusser et al. |
| 6,443,513 B1 | 9/2002 | Glance |
| 6,547,280 B1 | 4/2003 | Ashmead |
| 6,679,544 B1 | 1/2004 | Hubbert et al. |
| 6,682,128 B2 | 1/2004 | Carroll, III et al. |
| 6,687,907 B1 | 2/2004 | Bortolini |
| 6,715,592 B2 | 4/2004 | Suzuki et al. |
| 6,752,450 B2 * | 6/2004 | Carroll, III ............. B32B 3/28 188/371 |
| 6,763,322 B2 | 7/2004 | Potyrailo et al. |
| 6,777,062 B2 * | 8/2004 | Skaja ..................... B32B 3/26 428/143 |

(56) References Cited

U.S. PATENT DOCUMENTS

| | | | |
|---|---|---|---|
| RE38,745 E * | 6/2005 | Foster | B32B 27/32 |
| | | | 428/215 |
| 6,938,290 B2 | 9/2005 | McKinney et al. | |
| 7,033,666 B2 | 4/2006 | Skaja | |
| 7,143,876 B2 | 12/2006 | Tamada et al. | |
| 7,163,244 B2 | 1/2007 | Meltzer | |
| 7,249,662 B2 | 7/2007 | Itou | |
| 7,360,822 B2 | 4/2008 | Carroll, III et al. | |
| 7,377,577 B2 | 5/2008 | Carroll, III et al. | |
| 7,384,095 B2 | 6/2008 | Cormier et al. | |
| 7,416,775 B2 | 8/2008 | Snel | |
| 7,441,758 B2 | 10/2008 | Coffield et al. | |
| 7,488,523 B1 | 2/2009 | Muncaster et al. | |
| 7,574,760 B2 | 8/2009 | Foley et al. | |
| 7,575,796 B2 * | 8/2009 | Scott | B32B 7/02 |
| | | | 267/153 |
| 7,625,023 B2 | 12/2009 | Audi et al. | |
| 7,690,160 B2 | 4/2010 | Moller, Jr. | |
| 7,810,291 B2 | 10/2010 | McPherson | |
| 7,866,248 B2 | 1/2011 | Moore, III et al. | |
| 7,900,416 B1 * | 3/2011 | Yokubison | E04F 15/10 |
| | | | 52/592.1 |
| 7,908,802 B2 * | 3/2011 | Frederiksen | E01C 5/20 |
| | | | 52/177 |
| 7,958,681 B2 * | 6/2011 | Moller, Jr. | E01C 5/20 |
| | | | 52/181 |
| 8,061,098 B2 * | 11/2011 | Whelan | B32B 33/00 |
| | | | 52/409 |
| 8,221,856 B2 | 7/2012 | Stroppiana | |
| 8,458,987 B2 * | 6/2013 | Becker | E04F 15/18 |
| | | | 52/746.1 |
| 8,465,087 B2 | 6/2013 | Gerwolls et al. | |
| 8,528,280 B2 | 9/2013 | Coil et al. | |
| 8,568,840 B2 | 10/2013 | Sawyer et al. | |
| 8,726,424 B2 | 5/2014 | Thomas et al. | |
| 8,777,191 B2 | 7/2014 | Kligerman et al. | |
| 8,915,339 B2 | 12/2014 | Kanous et al. | |
| 8,919,069 B2 | 12/2014 | Bird et al. | |
| 8,998,298 B2 * | 4/2015 | Gerwolls | F16F 3/0876 |
| | | | 296/187.05 |
| 9,194,136 B2 | 11/2015 | Cormier et al. | |
| 9,249,853 B2 * | 2/2016 | Cormier | B60R 13/0815 |
| 9,279,258 B2 * | 3/2016 | Cormier | B32B 27/08 |
| 9,394,702 B2 | 7/2016 | Cormier et al. | |
| 9,420,843 B2 | 8/2016 | Cormier et al. | |
| 9,462,843 B2 | 10/2016 | Cormier et al. | |
| 9,528,280 B2 | 12/2016 | Cormier et al. | |
| 9,622,534 B2 | 4/2017 | Cormier et al. | |
| 9,644,699 B2 * | 5/2017 | Cormier | B60R 21/04 |
| 10,047,484 B2 | 8/2018 | Sawyer | |
| 2002/0017805 A1 | 2/2002 | Carroll, III et al. | |
| 2003/0154676 A1 * | 8/2003 | Schwartz | A47G 27/0293 |
| | | | 52/391 |
| 2003/0177729 A1 | 9/2003 | Sabados | |
| 2005/0133324 A1 | 6/2005 | Soto Bailon et al. | |
| 2005/0158123 A1 | 7/2005 | Ianniello et al. | |
| 2005/0200062 A1 * | 9/2005 | Maurer | F16F 7/08 |
| | | | 267/144 |
| 2005/0281987 A1 | 12/2005 | Starke | |
| 2007/0267261 A1 | 11/2007 | Toccalino et al. | |
| 2008/0176010 A1 | 7/2008 | Sawyer et al. | |
| 2009/0165414 A1 * | 7/2009 | Burk | E04F 15/225 |
| | | | 52/403.1 |
| 2010/0203292 A1 | 8/2010 | Seth et al. | |
| 2010/0229486 A1 * | 9/2010 | Keene | E04F 15/20 |
| | | | 52/403.1 |
| 2010/0313510 A1 * | 12/2010 | Tang | E04F 15/0215 |
| | | | 52/403.1 |
| 2011/0072748 A1 | 3/2011 | Simonson et al. | |
| 2011/0135852 A1 * | 6/2011 | Sawyer | E04B 5/48 |
| | | | 428/17 |
| 2013/0291457 A1 * | 11/2013 | Tillery | E04F 15/02161 |
| | | | 52/177 |
| 2014/0000202 A1 * | 1/2014 | Dixon | E04F 15/107 |
| | | | 52/403.1 |
| 2014/0007761 A1 | 1/2014 | Haidar | |
| 2014/0287843 A1 | 9/2014 | Craven | |
| 2014/0133075 A1 | 10/2014 | Cormier et al. | |
| 2014/0311074 A1 * | 10/2014 | Cormier | E01C 13/02 |
| | | | 52/403.1 |
| 2014/0311075 A1 * | 10/2014 | Cormier | E01C 13/02 |
| | | | 52/403.1 |
| 2015/0059276 A1 * | 3/2015 | Valentine | E04F 15/225 |
| | | | 52/403.1 |
| 2016/0123021 A1 * | 5/2016 | Cormier | B29C 45/14 |
| | | | 52/403.1 |
| 2016/0138275 A1 * | 5/2016 | Cormier | E01C 13/045 |
| | | | 52/403.1 |
| 2016/0177562 A1 | 6/2016 | Cormier et al. | |
| 2017/0101789 A1 * | 4/2017 | Cormier | E04F 15/22 |
| 2017/0362840 A1 * | 12/2017 | Paul | B32B 27/08 |
| 2018/0030667 A1 * | 2/2018 | Penland, Jr. | B32B 3/30 |
| 2018/0073254 A1 * | 3/2018 | Hainbach | E04F 15/02177 |
| 2018/0080235 A1 * | 3/2018 | Downey | E04F 15/22 |
| 2018/0111518 A1 | 4/2018 | Cormier et al. | |
| 2018/0202150 A1 * | 7/2018 | Downey | B32B 27/365 |
| 2019/0136548 A1 * | 5/2019 | Jang | B32B 27/304 |
| 2020/0149292 A1 * | 5/2020 | Downey | B32B 3/30 |

FOREIGN PATENT DOCUMENTS

| | | |
|---|---|---|
| FR | 2209867 | 7/1974 |
| JP | 08085404 | 4/1996 |
| JP | 9150692 | 6/1997 |
| JP | 11348699 | 12/1999 |
| KR | 101011907 | 2/2011 |
| KR | 101363159 | 2/2014 |
| WO | 8203099 | 9/1982 |
| WO | 9300845 | 1/1993 |
| WO | 9711825 | 4/1997 |
| WO | 0031434 | 6/2000 |
| WO | 2006038029 | 4/2006 |
| WO | 2013183989 | 12/2013 |

* cited by examiner

Hexagonal Array of Multi-Stage Absorbing Members

Lobe Isometric View

Star Isometric View

Progressive Collapse of Lobe
Topped Members of Varying Height

Progressive Collapse of Star Topped
Members of Varying Height

Progressive Collapse of Flat Roofed
Members of Varying Height

PROGRESSIVE STAGE LOAD DISTRIBUTION AND ABSORPTION UNDERLAYMENT SYSTEM

CROSS REFERENCE TO RELATED APPLICATIONS

This patent application is a Continuation-In-Part of and claims priority to U.S. application Ser. No. 16/182,931 filed Nov. 7, 2018 and is related to the following cases, the contents of which are also incorporated by reference herein: U.S. Pat. No. 9,394,702 issued Jul. 19, 2016; U.S. Pat. No. 9,528,280 issued Dec. 27, 2016; U.S. application Ser. No. 15/388,304 filed Dec. 22, 2016, now U.S. Pat. No. 10,369,739 issued Aug. 6, 2019; U.S. application Ser. No. 15/333,291 filed Oct. 25, 2016, now U.S. Pat. No. 10,220,736 issued Mar. 5, 2019; and U.S. patent application Ser. No. 15/682,956 filed Aug. 22, 2017, now U.S. Pat. No. 10,788,091 issued Sep. 29, 2020.

BACKGROUND OF THE INVENTION

(1) Field of the Invention

Several aspects of this disclosure relate to a progressive stage load distribution and absorption underlayment system, primarily for comfort underfoot and injury mitigation in such environments of use as an elder care or senior living facility.

BRIEF SUMMARY OF THE INVENTION

It would be desirable to implement below a superstructure that receives percussive impacts an underlayment system that will reduce impact forces and therefore reduce the potential risk of injury associated with fall-related impacts on the surface. Potential benefits include reducing injury risk due to falls on the flooring surface, minimizing system cost, maintaining system durability, facilitating installation, abating noise while offering surface quality and comfort for both patients and caregivers.

While such underlayment layers provide some added benefit, they also increase system cost, installation complexity, and often reduce the durability of the top flooring material. To date, no commercially cost effective and durable underlayment system has been developed that provides a substantial injury risk reduction due to falls on the variety of flooring products. Several attempts have been made, but such approaches often fail to meet certain performance and cost effectiveness objectives.

One important aspect when considering deploying an underlayment system for impact protection is the consistency in performance over the entire surface. The impact performance of previous approaches varies substantially when comparing the center of the energy absorbing material and the seams or joints between adjacent energy absorbing materials. The seams between foams, rolls or panels, for example, lack cross linking or bonds between adjacent energy absorbers. These areas are weaker than the center of the energy absorber and deform at a lower applied load compared to the areas away from the seam. This results in areas where not only is the impact performance inconsistent across the surface, but also promotes loss of balance since locations are not visible. Finally, these areas can also promote inconsistent wear patterns in the floor covering that may result in visual and structural defects over time due the stress induced on the floor covering by the seams in the underlayment. While some technologies, like foam, may be weaker at the seams one can appreciate that other products like injection molded tiles maybe stronger at the seams and weaker in the center, again creating inconsistencies in impact, instability, and wear patterns across a flooring surface.

Another important aspect when considering deploying an underlayment system for impact protection is comfort and vibration damping under foot. The ideal underlayment product would provide both enhanced comfort under foot while providing enhanced impact protection. Conventional approaches historically accomplished this by adding layers to the construction which adds both cost and system complexity. For example, two layers of foam that differ in density and or chemistry may be layered beneath the flooring surface where a softer layer enhances comfort under foot and a second more firm layer enhances the impact absorbing properties. Injection molded tiles will often be assembled between a layer of compliant foam and the finished flooring product. Adding layers to flooring system result in added costs, complexity, and failure modes that are undesirable.

Against this background, it would be desirable to develop a progressive stage load distribution and absorption system that would underlay a superstructure material such as flooring system to mitigate injuries and soften footfalls, while reducing noise and vibration where possible.

Ideally, such a system would be of relatively low cost and present a low profile to minimize tripping, yet be durable. In several embodiments, an underlayment infrastructure would be compatible with a superstructure material such as sheet vinyl and carpet.

This disclosure includes a progressive or multi-stage load distributing and absorbing system that lies below a superstructure material which is exposed to percussive forces. The progressive stage load distributing and absorbing system is interposed between the superstructure material and a foundation below. In several embodiments, such progressive systems offer a first and one or more subsequent levels of reaction to an impacting load, the reaction varying from a initially relatively compliant stage and then transforming to a gradually stiffer response to further load absorption. This behavior tends to offer a padded response to for example a heavy footfall or a tumbling patient. As a result, serious injury may be lessened or avoided.

Several embodiments contemplate one or more progressive stage load distributing and absorbing tiles that are positioned side-by side. At least some of the tiles have a barrier layer that lies below the superstructure material—primarily to distribute, rather than absorb an impacting force, such as a heavy footfall. To cushion the blow, a load absorbing underlayment infrastructure is positioned below the barrier layer.

The underlayment infrastructure in a typical tile has one or more progressive stage "hat-shaped" (defined below) absorbing members. In a preferred embodiment, each of those members has a relatively stiff initial load transmission subsystem that preferably lies below and next to the barrier layer. This subsystem at first transmits forces from the hit to a relatively compliant stage absorbing subsystem. In this disclosure "relatively" broadly refers to the relative stiffness of the stiff and compliant absorbing subsystems in response to a hit. The compliant subsystem may be lowermost (preferably), or in some embodiments be uppermost. After the compliant subsystem deflects and perhaps bottoms out, the primary role of the stiff stage absorbing subsystem reverts to load absorption, rather than load transmission.

Consider one relatively stiff force transmission subsystem that primarily transmits, rather than absorbs energy. As noted earlier, it lies below the barrier layer. In that subsystem is a basal portion that preferably is positioned adjacent to the barrier layer. The basal portion originates as a sheet material that is preferably thermoformed to produce the stiff and compliant progressive stage absorbing members that constitute the disclosed infrastructure. Alternative methods include compression molding, casting, vacuum forming and injection molding.

In at least some of the stiff stage progressive absorbing members, a curvilinear wall extends from the basal portion toward the foundation. Preferably, such a wall has a draft angle (0, FIG. 1) that lies between about 4 and 40 degrees. This wall has a top region extending from the basal portion and a bottom region at the opposite end portion of the wall. In several embodiments, a shoulder portion extends inwardly from the bottom region. In other embodiments, the shoulder portion may not exist. In those cases, there is a somewhat continuous transition between the stiff and compliant stage subsystems.

Following impact upon the superstructure, ignoring optional adhesives, a load is transmitted across the barrier layer initially to the stiff stage subsystem of the progressive stage absorbing members of the underlayment infrastructure. Such load travels through the wall of the stiff stage absorbing subsystem, it reaches across a shoulder (if a shoulder exists) and then to the compliant stage absorbing subsystem before impinging on the foundation. If there is a rebound or recoil, such loads are delivered back to the stiff stage, which then assumes a more compliant role rather than its former load-transmission role. In such walls, load absorption is achieved by the wall bending inwardly or outwardly to or toward an un-deflected position.

One result of these subsystems cooperating in the described manner is that the compliant stage absorbing subsystem deflects before one or more of the stiffer transmission stage absorbing subsystems in response to the load. The relatively stiff subsystem is available to absorb what remains of the impacting load after the compliant stage has deflected or bottomed out. Consequently, footfalls are softened, vibration is lessened, noise is reduced and injury after a fall is mitigated.

Accordingly, several embodiments of this disclosure include a progressive stage load distributing and progressive stage energy absorbing system that lies below a superstructure material which is exposed to continual or intermittent percussive loads. Often, such forces may cause a high localized pressure, such as when forces from a wheelchair are exerted through narrow wheels.

In the underlayment infrastructure, load absorption is mainly provided by groups of progressive stage absorbing members that are provided in tiles thereof (described below). Tiles are united by inter-engagement of overlapping barrier layers that overhang the ceilings of adjacent tiles.

DETAILED DESCRIPTION OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ alternative embodiments of this disclosure.

This disclosure includes a progressive stage load distributing and absorbing system 10 (FIG. 1) that lies below a superstructure material 12 which is exposed to steady or intermittent percussive forces. The progressive stage load distributing and absorbing system 10 is interposed between a superstructure material (such as tile or carpeting, for example) 12 and a foundation 16 below.

Figure 2:
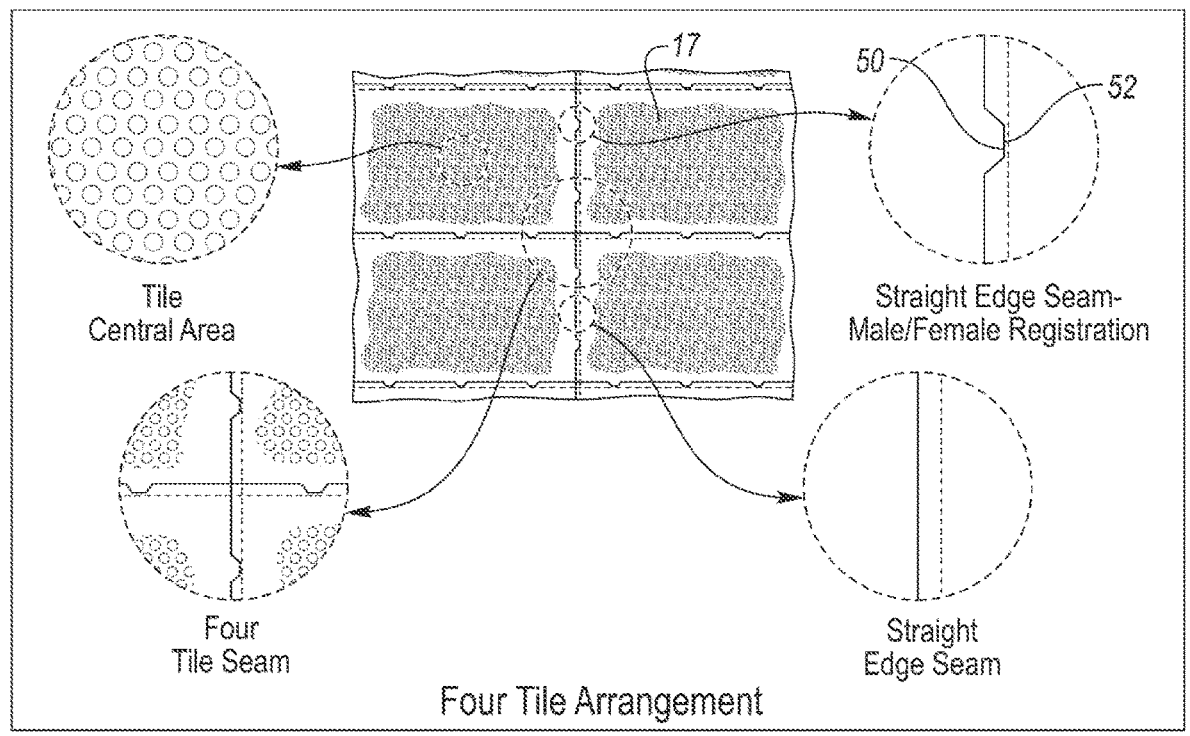
FIG. 2 is a top view of an embodiment of a progressive stage load distributing and absorbing underlayment system that has four quadrilateral, preferably rectangular tiles.
Figure 3:
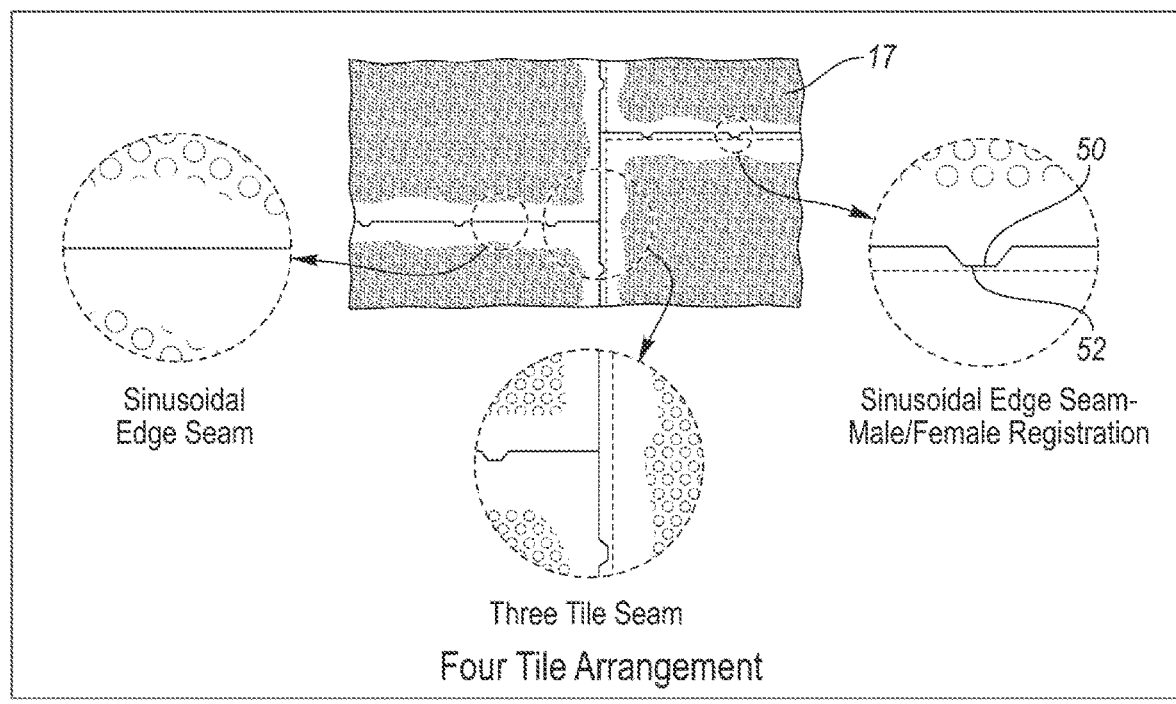
FIG. 3 is a top view of an embodiment of a progressive stage load distributing and absorbing underlayment system that has four quadrilateral tiles with various edge seams.

Several embodiments have one or more progressive stage load distributing and absorbing tiles 17 (FIGS. 2-3). At least some of the tiles 17 have a barrier layer 18 that lies below the superstructure material 12 primarily to distribute, rather than absorb an impacting load, such as a heavy footfall or a rolling wheelchair. To cushion the blow, mute noise and deaden vibration, an underlayment infrastructure (described later) 20 is positioned below the barrier layer 18.

Figure 1:
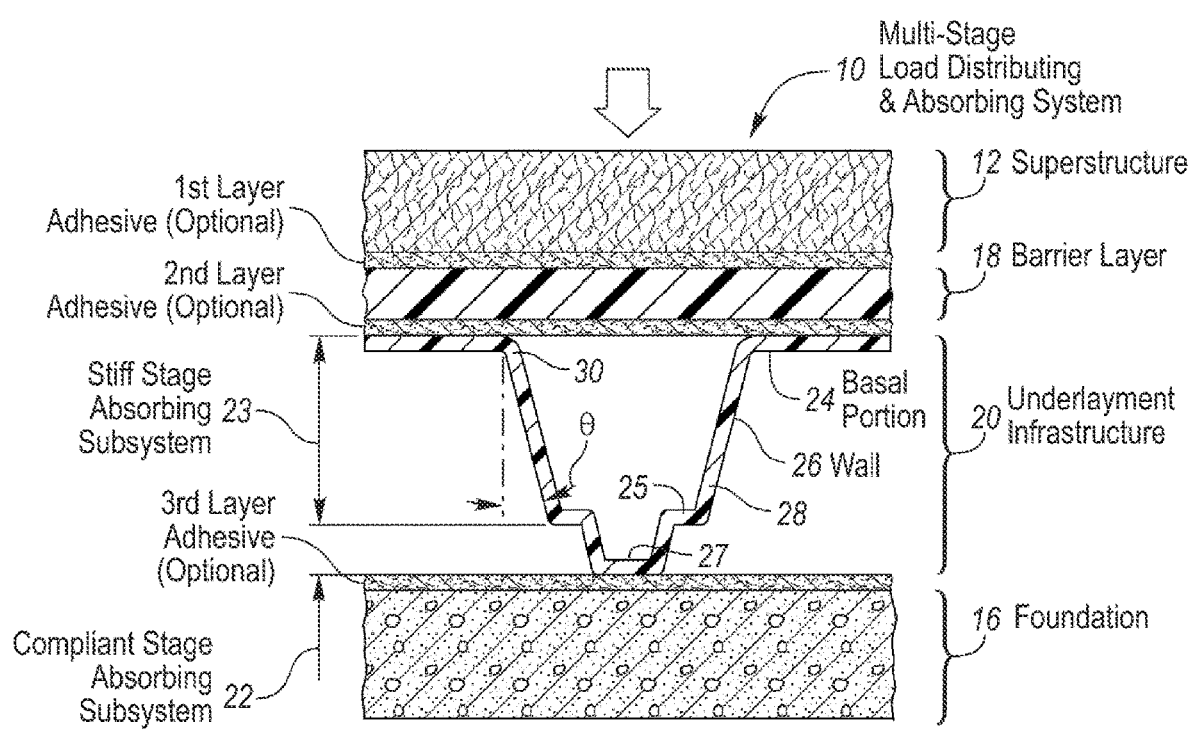
FIG. 1 is a vertical section of one embodiment of a progressive stage load distributing and absorbing underlayment system.

The tiles 17 that house the underlayment infrastructure 20 have one or more progressive stage hat-shaped (defined below) absorbing members 21 (FIG. 1). One or more of those members 21 have a relatively stiff load transmission subsystem 23 that delivers force to a compliant stage absorbing subsystem 22 that is the first subsystem to deflect. Preferably, the compliant stage 22 absorbing subsystem lies adjacent to the foundation 16.

Included in the stiff force transmission (and later, residual force-absorbing) subsystem 23 is a basal portion 24 that in several embodiments is positioned adjacent to the barrier layer 18 (FIG. 1). The basal portion 24 originates as a sheet material that is preferably thermoformed to produce the progressive stage absorbing members 21 that constitute the disclosed infrastructure 20.

A curvilinear wall 26 extends from the basal portion 24 toward the foundation 16. In this context, "curvilinear" means curved when viewed from above or below and substantially linear before impact when viewed from the side. This wall 26 has a top region 30 extending from the basal portion 24 and a bottom region 28 at the opposite end portion of the wall 26. In several embodiments, a shoulder portion 25 extends inwardly from the bottom region.

After impact, loads are transmitted across the barrier layer 18 to the stiff force transmission subsystem 23, and then to the compliant stage absorbing subsystem 22 that extends from the stiff stage subsystem 23, in many embodiments towards the foundation 16.

To set the stage (returning to FIGS. 2-3), in exemplary embodiments of a progressive stage energy absorbing underlayment system 10, there are four tiles 17 secured to one another. This arrangement of adjacent tiles produces four-tile seams and two-tile seams. Four areas are magnified in FIG. 2 to show three unique seam conditions compared to the tile central area. The tile central area (far left) has no seams and constitutes above 85% of the system surface area. The other 15% includes seams of various configurations that need to perform in a similar manner to the tile central area. This is in contrast with the four-tile seam (lower left) where four barrier layers intersect. The straight two-panel seam (lower right) and straight two-panel male/female registration seam (upper right) are also depicted in FIG. 2.

In FIG. 2, there is a staggered configuration that forms a progressive stage load distribution and energy absorbing system. This arrangement of adjacent tiles produces three-panel (FIG. 3) and two-panel seams. Three areas have been magnified in FIG. 3 to show the remaining three unique seam conditions that contrast with the four shown in FIG. 2. The two-tile sinusoidal edge seam (lower left) is where the trim edge of the adjacent underlayment infrastructure is sinusoidal. The three-tile seam (bottom middle) is where three barrier layers intersect. Finally, we see one example of the two-tile male/female registration sinusoidal edge seam (lower right).

Figure 4:
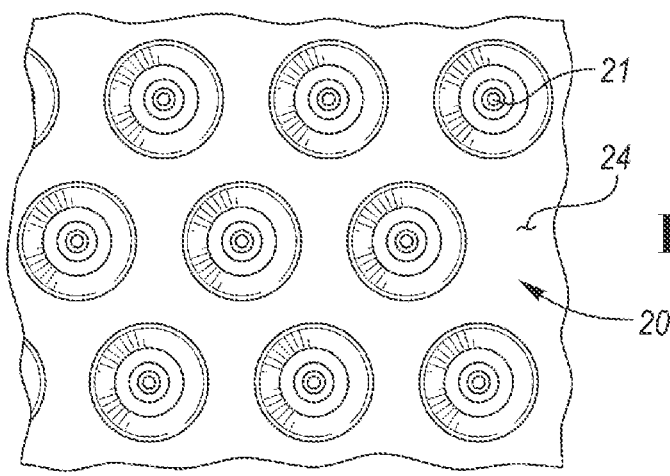
FIG. 4 shows a hexagonal array of load absorbing members in an underlayment infrastructure.

FIG. 4 is a bottom view of one embodiment of a thermoformed underlayment infrastructure 20 showing an array of energy absorbing members 21 in a hexagonal configuration. The basal portion 24 between adjacent members 21 may be planar or ribbed, depending on the desired layout. Generally, the hexagonal array is preferred due the dense arrangement of adjacent structures.

As described herein, there are three alternative embodiments of a representative compliant stage subsystem—a lobe feature, a star-shaped feature, and a configuration in which adjacent groups of members have different heights.

Figure 5:
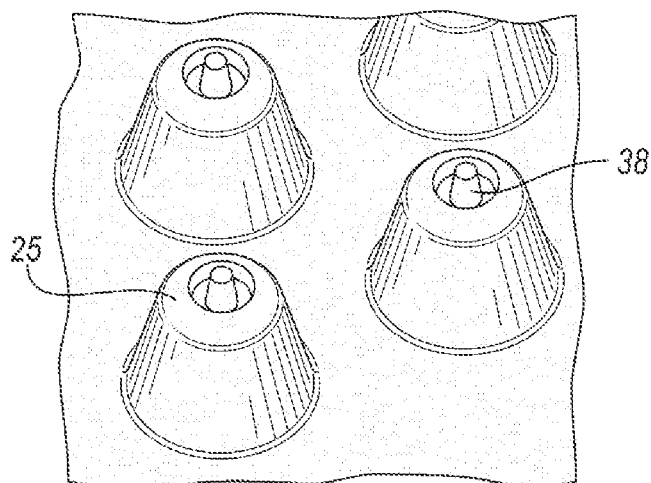
FIG. 5 is an isometric view of these members, with a lobe forming part of a compliant stage.

FIG. 5 is an isometric bottom view of a lobe embodiment 38 of a compliant stage 22 in typical load absorbing members 21. Here, there is an array of hat-shaped progressive stage absorbing members 21 that possess a male lobe 38 whose base 40 is recessed within the shoulder 25 of the member 21. The lobe 38 is surrounded by a moat-like depression which is recessed into the shoulder. The top of the lobe extends beyond the plane of the shoulder, much like a tower that lies inside and above the moat. This moat draws material into itself during the thermoforming process and preferentially lobe walls.

Figure 6:
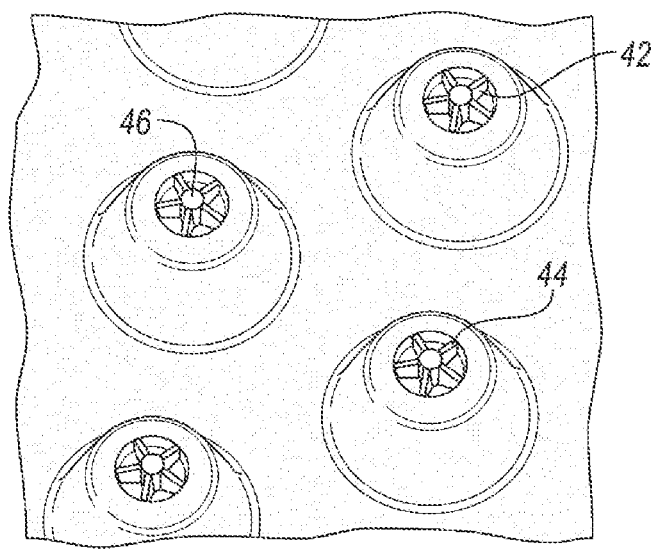
FIG. 6 is an isometric view of an alternate embodiment of such load absorbing member, with a star-shaped compliant stage.

FIG. 6 is an isometric view of a star-shaped feature 42 that crowns the compliant stage 22. The star may have 3-10 arms 44. A nucleus portion 46 of a star-shaped feature 42 has a geometry that may be selected from any number of polygonal shapes to create a feature that is both recessed within and protrudes from the shoulder portion 25 of the member 21. This depth-up draw occurs largely because a small footprint creates a weakening and a lower resistance to an applied load for the "drawn feature" (e.g., compliant stage 22) compared to a "host feature" (e.g., stiff stage 23). Portions of the star may be relatively flat or be recessed.

Figure 9:
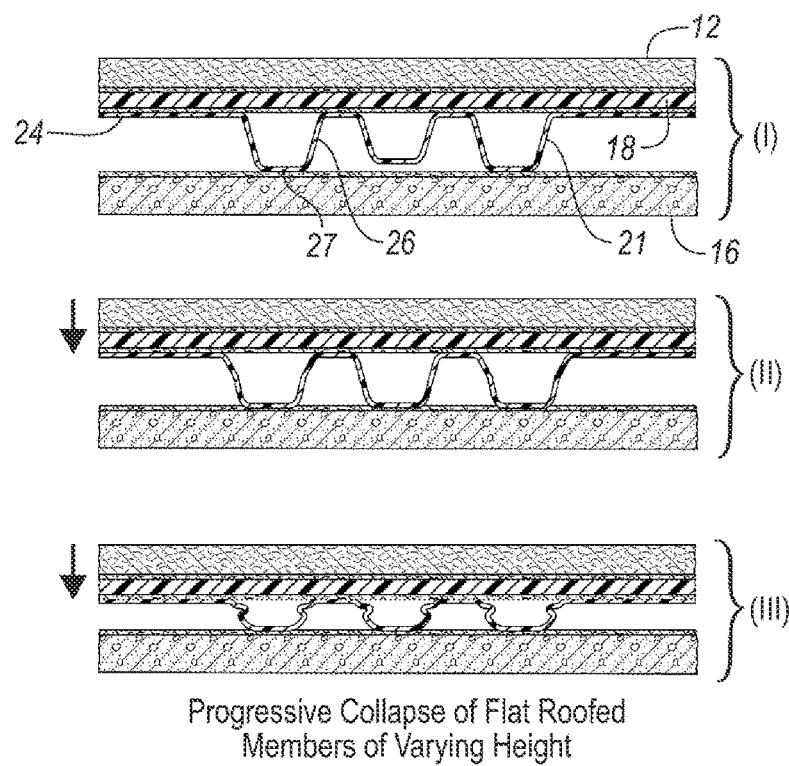
FIG. 9 illustrates progressive collapse of flat roofed members of varying height.
Figure 10:
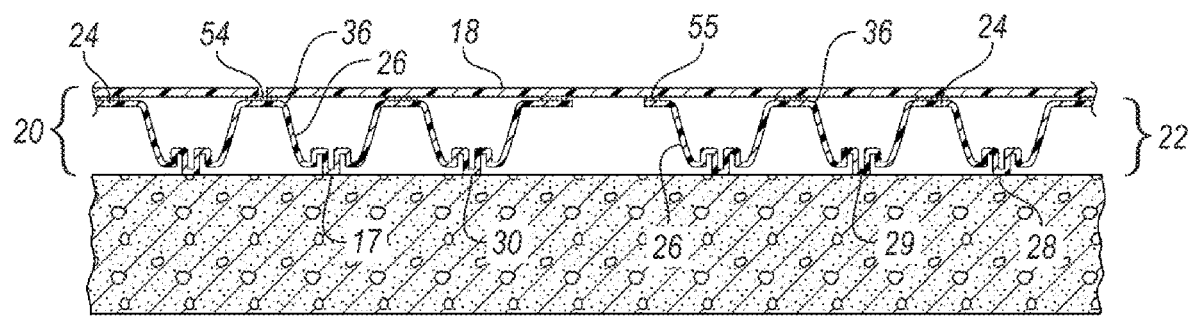
FIG. 10 is a cross sectional view of the progressive stage load distributing and absorbing system including an underlayment infrastructure with a progressive load absorbing member, including a stiff stage and one embodiment of a compliant stage.
Figure 12:
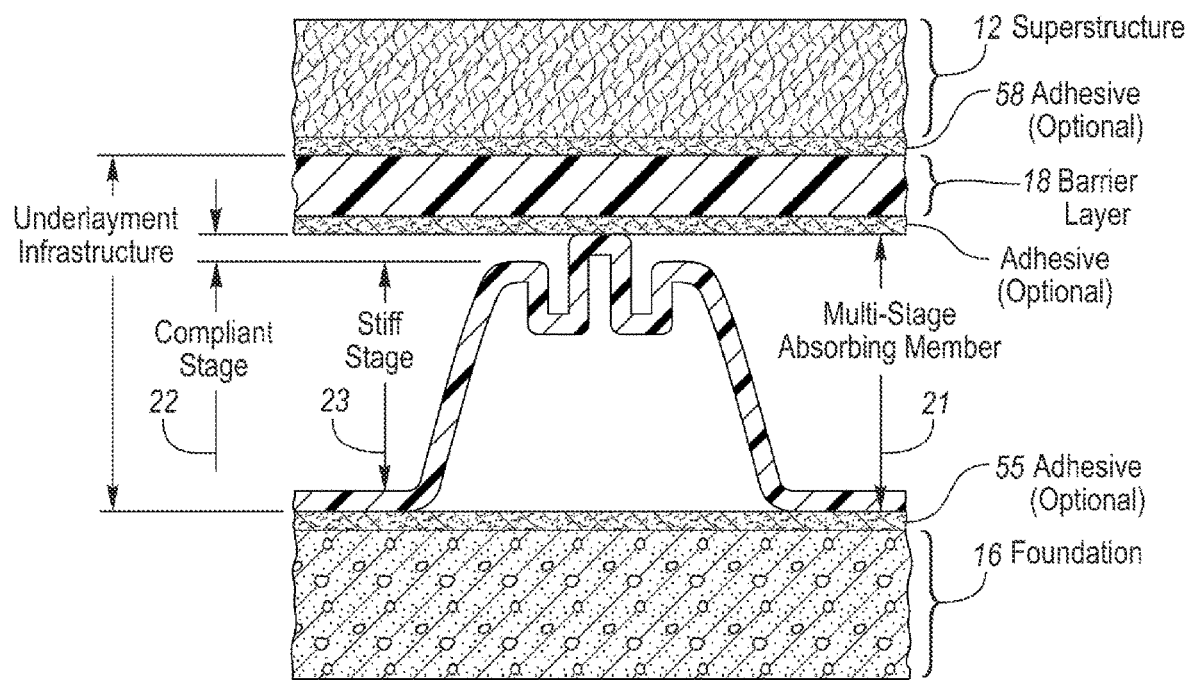
FIG. 12 shows an alternative (inverted) embodiment of a load absorbing member.

FIG. 9 is sectional view through a third alternate ("sky scraper") embodiment 48 of a progressive stage underlayment infrastructure 10 in which adjacent load absorbing members 21 or groups of load absorbing members are of different heights. Separating each of such members is a basal portion 24, i.e., the substantially unchanged portion of the sheet that enters the thermoforming process. A curvilinear wall 26 extends there from and a floor 27 lies across the lower portion 28 of the curvilinear wall. Such a structure could be installed so that the basal portion 24 is positioned adjacent to the barrier layer 18. In an inverted configuration (see, e.g., FIG. 12), the basal portion 24 is positioned adjacent to the foundation 16. Note that the plane (or ceiling or floor portion) of each member 21 is flat (i.e., it lacks a drawn feature) and lies parallel to the foundation 16. The first section (I) shows that the system, at a minimum, bears the weight of the superstructure 12 itself. Under an applied load in excess of the taller member yield force, the taller weaker members begin compressing and absorbing a portion of the total load exerted (see, (II)). This continues until the floor of the shorter members contacts the foundation (see, (III)). At that stage, the force required to compress the system further is greater than that required to compress the taller members.

The compression characteristics of the taller and shorter members 21 can be tuned by selecting material type, material thickness, draw depth and the like to develop characteristics that enhance comfort under foot, dampen vibrations, or absorb sound. The third section (III) in FIG. 9 shows the response of the system to an even higher applied load. Under this load level, which is likely at a level tuned to reduce the risk of fall injury, both the taller and shorter members collapse in a controlled manner to absorb the impact load.

In each embodiment of the compliant stage (see, e.g. FIGS. 7-8), there is a progressive collapse of members from the weakest to the strongest. However, there is an additional level of crush resistance. The first section (I) shows the compression of the drawn feature (e.g., a lobe) that extends from the member's floor in a direction opposite to that in which the stiff stage compliant subsystem lies. Once the drawn feature collapses (II), the load is transferred to the taller member (relatively stiff subsystem) which begins bearing its share of the load. Once the applied force exceeds the yield force of the taller members, they begin to collapse until they compress to the point where the smaller members contact the foundation (III). Finally, once an applied load exceeds the force required to yield the entire load distributing and absorbing system, the taller and shorter apertures collapse simultaneously IV).

Figure 7:
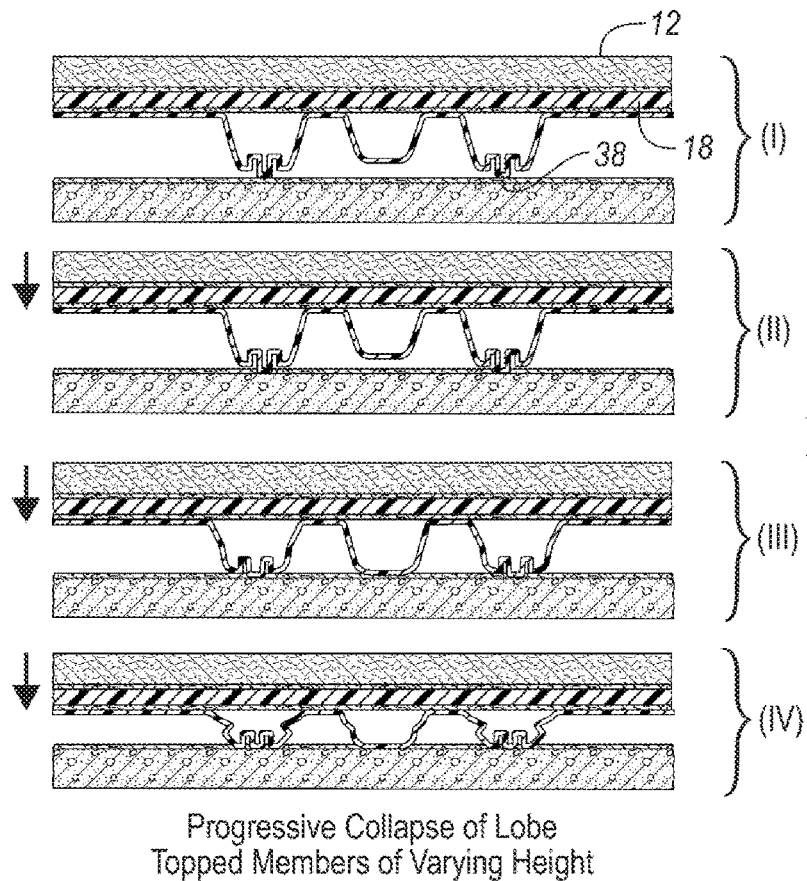
FIG. 7 illustrates progressive collapse of lobe-topped members of varying height.
Figure 8:
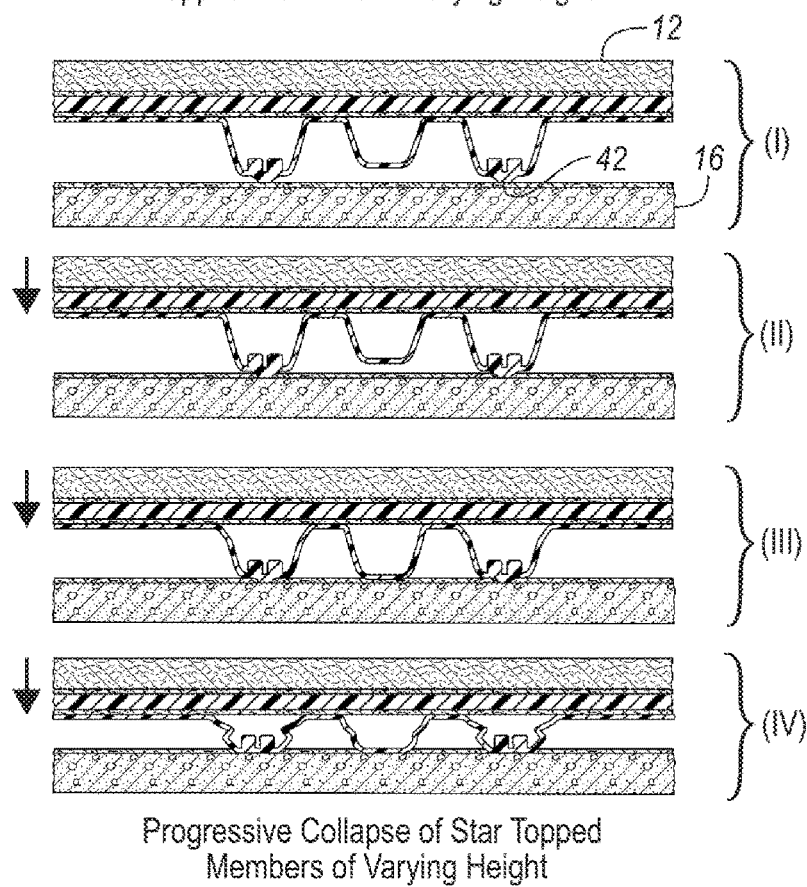
FIG. 8 illustrates progressive collapse of star-topped load absorbing members apertures of varying height.

FIG. 8 shows that the star-shaped embodiment of the compliant stage collapses in a somewhat different manner from the lobes in FIG. 7.

Alternative embodiments include absorbing member shapes beyond those depicted (e.g., those having a wall that is not curvilinear, but having a drawn feature in the associated member floor). Such a wall may be curved for instance, when viewed from the side in an undeflected condition. If desired, ribs may be provided for added stiffness between load absorbing members. Further, arrays of members may be arranged in a configuration (in contrast to FIG. 4) that is other than hexagonal. In some applications and environments, materials may be selected that are other than thermoplastic polyurethane and polycarbonate.

In one embodiment of a progressive stage load distributing and absorbing underlayment system 10 (e.g., FIG. 2), there are has four quadrilateral, preferably rectangular, tiles 17. A representative tile appears in FIG. 11. Such tiles are positioned relative to one another by inter-engaging mating registration features 50, 52, including male 50 and female 52 features provided along the edges of a barrier layer 18. Each tile 17, 19, 21, 23 has an infrastructure 20 with a plurality of absorbing members 22 for load absorption and a barrier layer 18 for load distribution.

Figure 11:
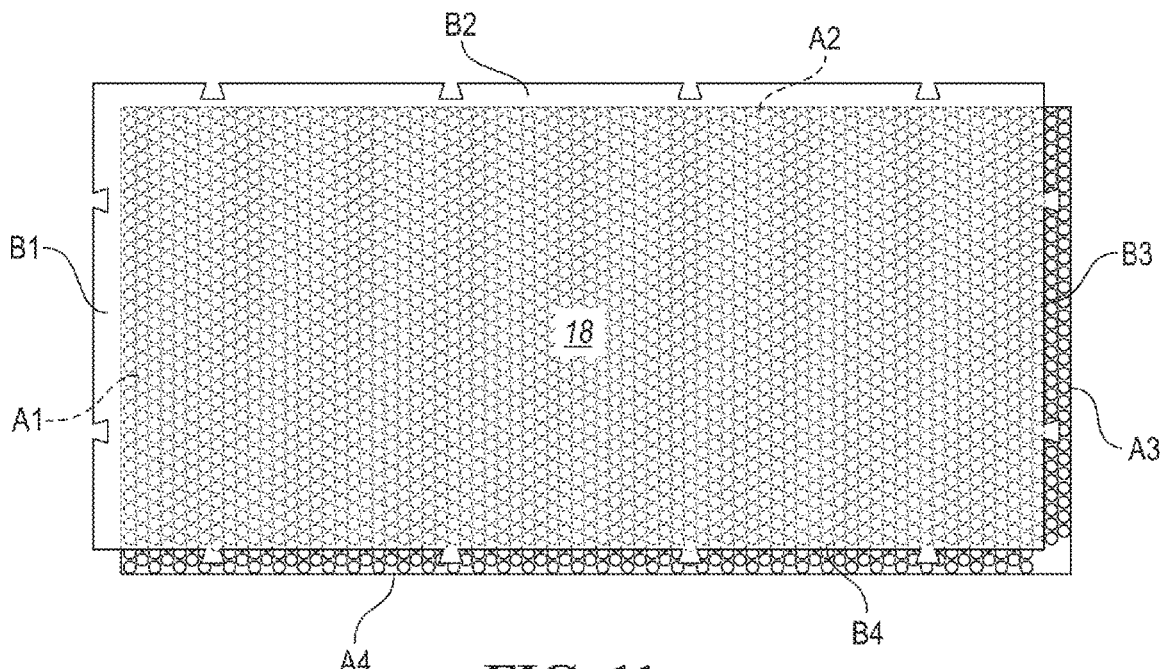
FIG. 11 illustrates a barrier layer of a tile that overlaps a load absorbing infrastructure below.

In FIG. 11, the barrier layer 18 (in this case) is quadrilateral with edges B1, B2, B3 and B4. A sub-assembly of underlying absorbing members 22 includes individual members 22 that are conjoined by basal portions 24 which, before for example thermoforming take the form of a planar basal sheet. The absorbing members 22 coordinate to form a periphery of the sub-assembly that in many cases is quadrilateral and has edges A1, A2, A3 and A4. Each barrier layer 18 preferably is securely affixed to one or more of the ceilings 24 in a tile. In some cases, the barrier layer 18 is affixed to one or more of the ceilings 24 by means for securing 55 such as an adhesive or by mechanical means including screws, rivets, pins and the like.

To promote inter engagement between tiles in an assembly, edge B1 of the barrier layer 18 overhangs edge A1 of the sub-assembly of absorbing members 22 and edge B2 overhangs edge A2. Thus, edges A3 and A4 of the sub-assembly of absorbing members 22 extend beyond overlying edges B3 and B4 of the barrier layer 18. This arrangement creates an overhanging L-shaped platform 25 of the barrier layer 18 and an open L-shaped overhanging portion formed by the ceilings 24 of the absorbing members 22 in the sub-assembly. In adjacent tiles, the L-shaped overhanging portion 27 associated with a given tile 19 supports the L-shaped platform of the barrier layer 18 of an adjacent tile. One consequence of this arrangement is that adjacent tiles engage each other in such a way as to inhibit relative lateral movement therebetween.

As shown in FIGS. 2-3, interlocking engagement of adjacent tiles in a group is provided by mating registration features 50, 52. In a preferred embodiment, these mating registration features 50, 52 are trapezoidal in shape. For example, a male trapezoid 50 abuts a female trapezoid 52 along the edges of adjacent tiles 17, 19, 21, 23. It will be appreciated that there are alternative shapes of mating registration features, such as keyholes, sawtooth, semicircles, jigsaw-like pieces, etc.

As used herein the term "hat-shaped" includes frusto-conical, which may or may not be inverted, as described later. Such hat-shaped members 22 may have a top wall portion 28 that has a footprint which is circular, oval, elliptical, a cloverleaf, a race track, or some other rounded shape with a curved perimeter. Similarly, for a bottom wall portion 30 of an absorbing member 21. As used herein the term "hat-shaped" includes shapes that resemble those embodied in at least these hat styles: a boater/skimmer hat, a bowler/Derby hat, a bucket hat, a cloche hat, a fedora, a fez, a gambler hat, a homburg hat, a kettle brim or up-brim hat, an outback or Aussie hat, a panama hat, a pith helmet, a porkpie hat, a top hat, a steam punk hat, a safari hat or a trilby hat. See, e.g., https://www.hatsunlimited.com/hat-styles-guide, which is incorporated by reference.

As used herein the terms "hat-shaped" and "frusto-conical" exclude structures that include a ridge line or crease in a continuous curvilinear wall 26 associated with an absorbing member 21, because such features tend to promote stress concentration and lead to probable failure over time when exposed to percussive blows. They tend to concentrate, rather than distribute or absorb incident forces.

Connecting the basal portion 24 between absorbing members and the floor 27 of an absorbing member 22 in most embodiments is a curvilinear wall 26. When viewed laterally, a curvilinear wall 26 appears substantially linear or straight before being subjected to an impact that may reign through the superstructure 12 on a barrier layer 18. When viewed from above or below, the footprint of the bottom portion 30 or top portion 28 may appear circular, elliptical, oval, a clover leaf, a race-track or some other rounded shape with a curved perimeter.

The floor 27 of an absorbing member 21 may be flat or crenelated. As noted earlier, the floor 27 or in some cases the basal portion 24 may have a drawn lobe feature 38 or a star-shaped feature 42 extending therefrom.

The absorbing members 21 may be manufactured from a resilient thermoplastic and be formed into frusto-conical or hat-shaped members that protrude from a basal sheet 24 which before exposure to a forming process is substantially flat.

In one preferred embodiment, the barrier layer 18 is made from a strong thin layer of a polycarbonate (PC), a composite or a metal or other suitable rigid material, the absorbing member 21 is made from a resilient thermoplastic polyurethane (TPU), and the means for securing 55 is provided by a pressure sensitive adhesive (PSA) which bonds well to both the PC and TPU.

Thus, an underlayment infrastructure 20 is created by the juxtaposition of a barrier layer 18 and an underlying infrastructure of progressive stage absorbing members 21.

An assembly of absorbing members 21 and overlying barrier layer 18 forms a tile 17. Adjacent tiles are inter-engaged by overlapping and underlapping edges of the barrier layer 18 in the manner described above. Preferably, a small, but acceptable, gap exists between barrier layers 18 associated with adjacent tiles.

If desired, a means for securing, such as an adhesive 55 can be applied to one or both surfaces prior to the application of pressure which then adhesively attaches a barrier layer 18 to a tile 17. An underlayment infrastructure 20 is thus assembled when the edges of adjacent tiles are brought into registration through the inter-engagement of mating registration features 50, 52 of adjacent edges of associated barrier layers 18.

While a pressure sensitive adhesive is a preferred embodiment of means for securing 55 a barrier layer 18 to the basal portion or ceiling 24 of a tile, alternatives for attaching overlapped tiles together through their associated barrier layers 18 include mechanical means for attaching such as Velcro®, tape, rivets, etc.

The overlap of the barrier layers 18 and proximity of the absorbing members 22 on adjacent tiles distributes a load applied to the barrier layer 18 over a broad area. Loads are evenly distributed when applied either on a seam between adjacent tiles or within a tile. Loads are at least partially absorbed by flexure and possible rebound of the compliant and stiff stages in the absorbing members.

In more detail, selected features of the disclosed progressive load distributing and absorbing system include:

A: Engineered Performance Consistency

Traditional flooring systems, which are installed over rigid surfaces such as concrete, tend to have little energy absorbing capabilities, thereby posing a risk for fall related injuries. Due the rigid nature of their construction, they do however provide a consistent surface in terms of firmness and stability under foot. A rigid surface such as a foundation supports the flooring product over its entire area. This is essential for products like ceramic tile, glass tile, wood flooring, and the like.

One challenge in developing, installing, and maintaining an attractive, yet compliant flooring system that reduces the risk of injury lies in engineering the system to maintain a consistent firmness and stability over the entire flooring surface throughout its normal life cycle, while being compliant. The system must balance compliance needs, yet accommodate other activities like walking, running, rolling in a wheelchair, and supporting other items such as furniture, equipment, and other objects. An ideal load distributing and absorbing system needs to be firm and stable under foot under such normal activities and at the same time be engineered to deflect or stroke to the greatest degree possible during a potentially injurious fall or impact event.

Additionally, the layers of the load distributing and absorbing system need to work in concert in order to maintain an attractive appearance after years of repeated wear and abuse. Ideally, the system needs to remain unblemished before, during, and after impact events and everyday activities.

The disclosed system is engineered for performance consistency at any and all points. Seven unique conditions were identified to confirm performance consistency via the scientific method and statistical probability analysis. These conditions will be described below. This will be followed by a description of the test devices and their intended purpose. Finally, a statistical analysis will be reported below that analyzes the consistency in performance across the entire surface.

B: Enhanced Load Distributing and Absorbing Flooring System

Thermoforming begins with a basal sheet of material of constant thickness. The thermoplastic raw material is heated to the softening point and then stretched over a form tool via vacuum, pressure, and mechanical means. The thickness of the thermoformed part is a function of the base raw material thickness, raw material type, form temperature, and tool geometry which includes depth of draft, draft angle, and the upper assist design and clearance. Generally, areas where the depth of draw is greatest, the material is stretched in multiple directions. This results in thinner wall profiles than areas that experience less stretching.

Load absorbing members typically have a thicker ceiling and floor, while there is substantial thinning in the curvilinear wall. These members produce a generally "square wave" force versus displacement response to an applied load. There is an initial ramp up in force until the wall buckles and then maintains a relatively constant reaction force to the applied load throughout the available stroke. In members formed from the same base thickness, ceteris paribus, taller structures will yield at a lower load level than shorter structures.

Representative applications and advantages include:
Military grade impact protection for seniors;
Reduces the risk of hip and other fractures due to falls;
Reduces the risk of traumatic brain injury due to falls;
Reduces fatigue with enhanced comfort under foot;
Stable under foot and is there when needed;
Engineered transitions between adjacent tiles meet ADA accessibility requirements;
Enhanced sound transmission loss performance;
Enhanced system vibration dampening;
Low profile for renovation or new construction;
Easy to install;
Compatible with conventional flooring adhesives;
Light weight;
Affordable;
Durable and capable of withstanding many impacts;
Can be installed over green concrete;
Provides additional thermal insulation;
Incorporates post-industrial content;
Acts as a vapor barrier.

Testing has demonstrated that use of various embodiments of the disclosed system may lead to a:
20-fold reduction in risk of critical head injury;
60% reduction in the probability of moderate head injury;
3-fold reduction in GMAX;
2.5-fold reduction femoral neck force during falls for average older females;
3-fold increase in force reduction;
2.5-fold reduction in energy restitution;
firm and stable and stable surface that supports mobility;
substantially more comfort under foot for caregivers and older adults.

Test data also indicate that the proposed progressive stage load distributing and absorbing systems have the potential to substantially reduce the risk of injury and improve the quality of life for both older adults and caregivers.

| TABLE OF REFERENCE NUMBERS | |
|---|---|
| Reference No. | Component |
| 10 | Progressive stage load distributing and absorbing system |
| 12 | Superstructure material |
| 14 | Underside of 12 |
| 16 | Foundation |
| 17 | Tile |
| 18 | Barrier layer |
| 19 | Tile |
| 20 | Underlayment infrastructure |
| 21 | Absorbing member |
| 22 | Compliant stage absorbing subsystem |
| 23 | Stiff stage absorbing subsystem |
| 24 | Basal portion |
| 25 | Shoulder portion |
| 26 | Curvilinear wall |
| 27 | Floor |
| 28 | Top region of 26 |
| 30 | Bottom region of 26 |
| 32 | Apertures |
| 34 | Means for securing |
| 36 | Upper portion of 26 |
| 38 | Lobe |
| 40 | Base of lobe |
| 42 | Star-shaped feature |
| 44 | Arm of 42 |
| 46 | Nucleus of 42 |
| 48 | Skyscraper embodiment |
| 50 | Male registration feature |
| 52 | Female registration feature |
| 54 | Sub-assemblies of absorbing members |
| 55 | Lower means for securing |
| 56 | Intermediate means for securing |
| 58 | Upper means for securing |
| 60 | |
| 61 | |
| 62 | |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A progressive stage load distributing and absorbing system that lies below a superstructure material which is exposed to percussive forces, the progressive stage load distributing and absorbing system being interposed between the superstructure material and a foundation, the progressive stage load distributing and absorbing system comprising:
   one or more load distributing and absorbing tiles, at least some of the tiles having
      a barrier layer that lies below the superstructure material;
      an underlayment infrastructure positioned below the barrier layer, the underlayment infrastructure including
         one or more progressive stage hat-shaped absorbing members, at least some of the progressive stage hat-shaped absorbing members having
            a stiff stage absorbing subsystem with members having a basal portion that is positioned adjacent to the barrier layer;
            a curvilinear wall extending from the basal portion, the curvilinear wall having a top region extending from the basal portion and a bottom region, and
            a shoulder portion extending from the bottom region; and
            a compliant stage load absorbing subsystem that extends from the shoulder portion towards the foundation, wherein
   the compliant stage load absorbing subsystem deflects before the stiff stage absorbing subsystem in response to the load, wherein the compliant stage load absorbing subsystem includes a star-shaped feature, and an assembly of hat-shaped absorbing members that have different heights, and combinations thereof, wherein the star-shaped feature has a polygonal configuration which includes a male feature that is recessed within and protrudes from the shoulder portion of an associated absorbing member.

2. The progressive stage load distributing and absorbing system of claim 1, wherein the superstructure material is selected from the group consisting of a ceramic tile, solid wood, a wood composite, a carpet, a carpet tile, sheet vinyl, a vinyl tile, a rigid vinyl tile, a rubber sheet, and a rubber tile, a grating, and an anti-slip metallic surface.

3. The progressive stage load distributing and absorbing system of claim 1, wherein the foundation is selected from the group consisting of a concrete, a gravel, a metal and a hardwood.

4. The progressive stage load distributing and absorbing system of claim 1, wherein the barrier layer includes a material selected from the group consisting of a rigid thermoplastic, a composite and a metal.

5. The progressive stage load distributing and absorbing system of claim 1, further including a means for securing positioned between (A) the superstructure material and the barrier layer, or (B) the barrier layer and a basal layer, or (C) the compliant stage absorbing subsystem and the foundation or in a position that includes positions (A and B) or (A and C) or (B and C).

6. The progressive stage load distributing and absorbing system of claim 1, wherein at least some of the stiff stage absorbing subsystem members have a configuration defined at least in part by an upper portion of a wall that extends from a basal layer, a shape of the upper portion being selected from the group consisting of a circle, an oval, an ellipse, a clover leaf, a race-track, and other curved perimeters.

7. The progressive stage load distributing and absorbing system of claim 1, wherein at least some of the stiff stage absorbing subsystem members have a configuration defined at least in part by a lower portion of a wall adjacent to the shoulder portion, the footprint being selected from the group consisting of a circle, an oval, an ellipse, a clover leaf, a race-track, and other curved perimeters.

8. The progressive stage load distributing and absorbing system of claim 1, further including one or more tiles of underlayment infrastructures, wherein the barrier layer of a first tile extends from an edge thereof and overhangs at least some of the basal portions of an adjacent tile.

9. The progressive stage load distributing and absorbing system of claim 8, wherein a group of tiles are conjoined, at least some of the absorbing members having a load-attenuation characteristic such that within the group, there is a user-determinable force attenuation property that may be uniform or varied within the group.

10. The progressive stage load distributing and absorbing system of claim 9, wherein some tiles are joined together by mating registration features defined at edges of the barrier layers to form sub-assemblies of tiles.

11. The progressive stage load distributing and absorbing system of claim 10, wherein the registration features are defined by a male feature in an edge of a barrier layer that lies in registration with a female feature in an edge of a barrier layer associated with an adjacent tile, the registration features being selected from the group consisting of male and female trapezoidal features, male and female keyholes, sawtooth arrangements, semicircles and jigsaw-like pieces.

12. A progressive stage load distributing and absorbing infrastructure tile in a progressive stage load distributing and absorbing system that lies below a superstructure material which is exposed to percussive forces, the progressive stage load distributing and absorbing infrastructure tile being interposed between the superstructure material and a foundation, the progressive stage load distributing and absorbing infrastructure having
   a barrier layer for distributing at least some of the percussive forces that lies below the superstructure material and is quadrilateral with edges B1, B2, B3 and B4;
   an assembly of progressive stage load transmission and absorbing members for absorbing at least some of the percussive forces, such members being positioned below the barrier layer, the assembly having a perimeter that is quadrilateral with edges A1, A2, A3 and A4, wherein
      edge B1 of the barrier layer overhangs edge A1 of the progressive stage absorbing member and edge B2 overhangs edge A2, and edges A4 and A3 of the progressive stage absorbing member extend beyond overlying edges B4 and B3 of the barrier layer, thereby creating an L-shaped platform and an L-shaped overhanging portion that engage corresponding features of adjacent tiles, wherein
   a compliant stage load absorbing subsystem deflects before a stiff stage absorbing subsystem in response to the load, wherein the compliant stage load absorbing subsystem includes a star-shaped feature, and an assembly of hat-shaped absorbing members that have different heights, and combinations thereof, wherein the star-shaped feature has a polygonal configuration which includes a male feature that is recessed within and protrudes from the shoulder portion of an associated absorbing member.

13. The progressive stage load distributing and absorbing system of claim 1, wherein:
   a. the basal portion is thermoformed and has an average thickness (T),
   b. the curvilinear wall is thermoformed and has an average thickness (t); and
   c. (T)>(t).

14. The progressive stage load distributing and absorbing system of claim 1, wherein a floor or a wall of a compliant stage absorbing subsystem has a number (A) of apertures that allow moisture to drain therefrom, where 0<=A<100.

15. The progressive stage load distributing and absorbing system of claim 1, wherein the basal portion between adjacent progressive stage absorbing members in a tile has a length that is less than a distance between the facing upper portions of the wall of a progressive stage absorbing member.

16. The progressive stage load distributing and absorbing system of claim 1, further comprising one or more ribs extending at least partially between adjacent absorbing members.

17. The progressive stage load distributing and absorbing system of claim 1, wherein the superstructure material includes:
a surface selected from the group consisting of a floor located in a senior living or elder care facility, a hospital or out-patient facility; a marine environment, including boating decks and docks; a sports-playing surface; a walking/running track; a golf playing surface; a soccer, rugby, lacrosse, or football field; a stairway; a work mat; a work platform; an anti-fatigue mat; an enhanced comfort mat; a wall protection material; a playground; a day care floor; a flooring material in homes and residences; a military blast mat; and a seat in a military vehicle that may detonate a land mine.

18. The progressive stage load distributing and absorbing system of claim 1, further including a curvilinear wall with a draft angle between about 4 and 40 degrees.

19. The progressive stage load distributing and absorbing system of claim 1, wherein the star-shaped feature forms a small footprint that creates a weakening in the compliant stage and a lower resistance to an applied load compared to the stiff stage.

20. The progressive stage load distributing and absorbing system of claim 1, further having a lobe feature that includes a male lobe whose base is recessed within a floor of the associated hat-shaped absorbing member, the lobe feature being surrounded by a moat-like depression which is recessed into a floor of the hat-shaped absorbing member so that a top of the lobe feature extends beyond a plane of the floor.

* * * * *